United States Patent
Eveley

(10) Patent No.: US 9,376,098 B2
(45) Date of Patent: Jun. 28, 2016

(54) AUTOMOTIVE BRAKE CAM ASSEMBLY

(76) Inventor: Nicholas Eveley, Stoney Creek (CA)

( * ) Notice: Subject to any disclaimer, the term of this patent is extended or adjusted under 35 U.S.C. 154(b) by 2204 days.

(21) Appl. No.: 12/257,378

(22) Filed: Oct. 23, 2008

(65) Prior Publication Data

US 2009/0107786 A1 Apr. 30, 2009

Related U.S. Application Data

(60) Provisional application No. 60/983,998, filed on Oct. 31, 2007.

(51) Int. Cl.
*F16D 51/00* (2006.01)
*B60T 17/08* (2006.01)
*F16D 125/30* (2012.01)

(52) U.S. Cl.
CPC ........... *B60T 17/088* (2013.01); *F16D 2125/30* (2013.01)

(58) Field of Classification Search
CPC ............................ B60T 17/088; F16D 2125/30
USPC ............. 188/325, 324, 329, 330, 332, 205 R, 188/79.55; 74/567; 384/548; 277/530, 567
See application file for complete search history.

(56) References Cited

U.S. PATENT DOCUMENTS

| | | | | | |
|---|---|---|---|---|---|
| 2,331,652 | A | * | 10/1943 | Buckendale | 188/205 R |
| 3,076,531 | A | * | 2/1963 | Fisher et al. | 188/205 R |
| 3,497,037 | A | * | 2/1970 | Deibel | 188/329 |
| 4,476,968 | A | * | 10/1984 | Urban et al. | 188/329 |
| 4,576,488 | A | * | 3/1986 | Steiner et al. | 384/291 |
| 4,813,516 | A | | 3/1989 | Urban | |
| 4,838,389 | A | * | 6/1989 | Mamery | 188/78 |
| 4,890,939 | A | | 1/1990 | Kschinat | |
| 5,316,111 | A | * | 5/1994 | Layfield | 188/205 R |
| 5,316,115 | A | | 5/1994 | Urban | |
| 6,089,361 | A | * | 7/2000 | Davison et al. | 188/206 R |
| 6,240,806 | B1 | * | 6/2001 | Morris et al. | 74/567 |
| 6,302,075 | B1 | * | 10/2001 | Krieg et al. | 123/90.41 |
| 6,378,658 | B1 | | 4/2002 | Kay | |
| 6,799,975 | B1 | | 10/2004 | Dunn | |
| 2007/0140782 | A1 | * | 6/2007 | Morris et al. | 403/71 |
| 2008/0261704 | A1 | * | 10/2008 | Drouin | 464/7 |

FOREIGN PATENT DOCUMENTS

DE 3238351 3/1966

* cited by examiner

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

A brake cam assembly comprises a cam tube and a cam rod, each having an inboard end and an outboard end, relative to the wheel to be braked. The cam rod carries a cam at its outboard end to actuate the brake. At least one inboard bearing ring is secured inside the cam tube adjacent the inboard end and at least one outboard bearing ring is secured inside the cam tube adjacent the outboard end. The cam rod is rotatably supported by the bearing rings to be rotatable within the cam tube, with the outer surface of the cam rod being spaced from the interior surface of the cam tube. An inboard sealing ring is disposed at the inboard end of the cam tube, an outboard sealing ring is disposed at the outboard end of the cam tube, and a quantity of lubricant is disposed within the cam tube.

2 Claims, 4 Drawing Sheets

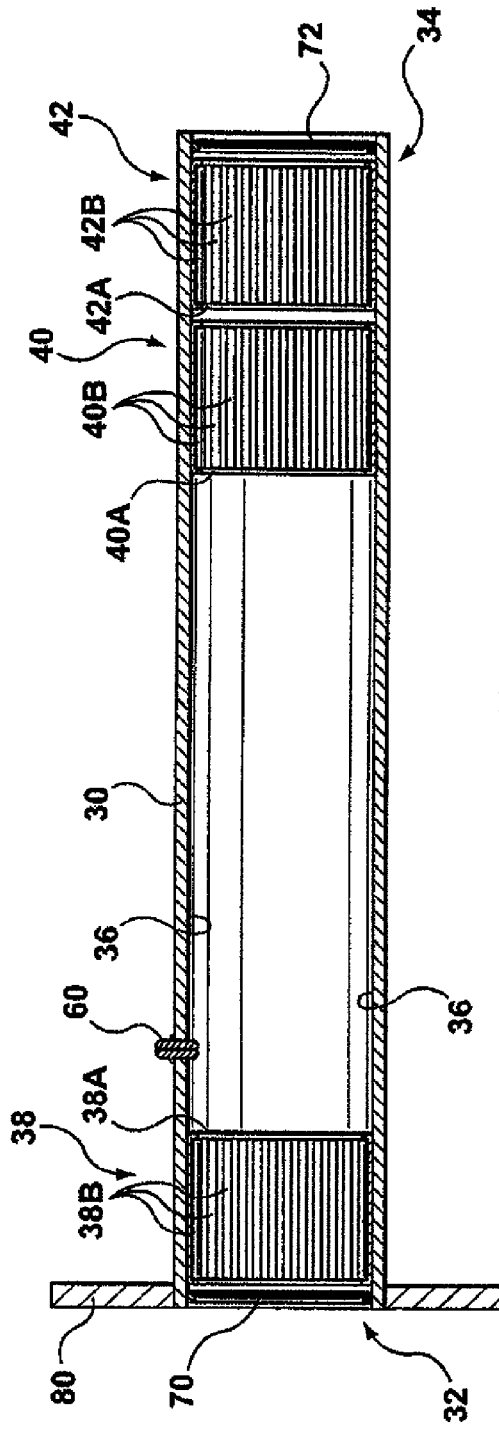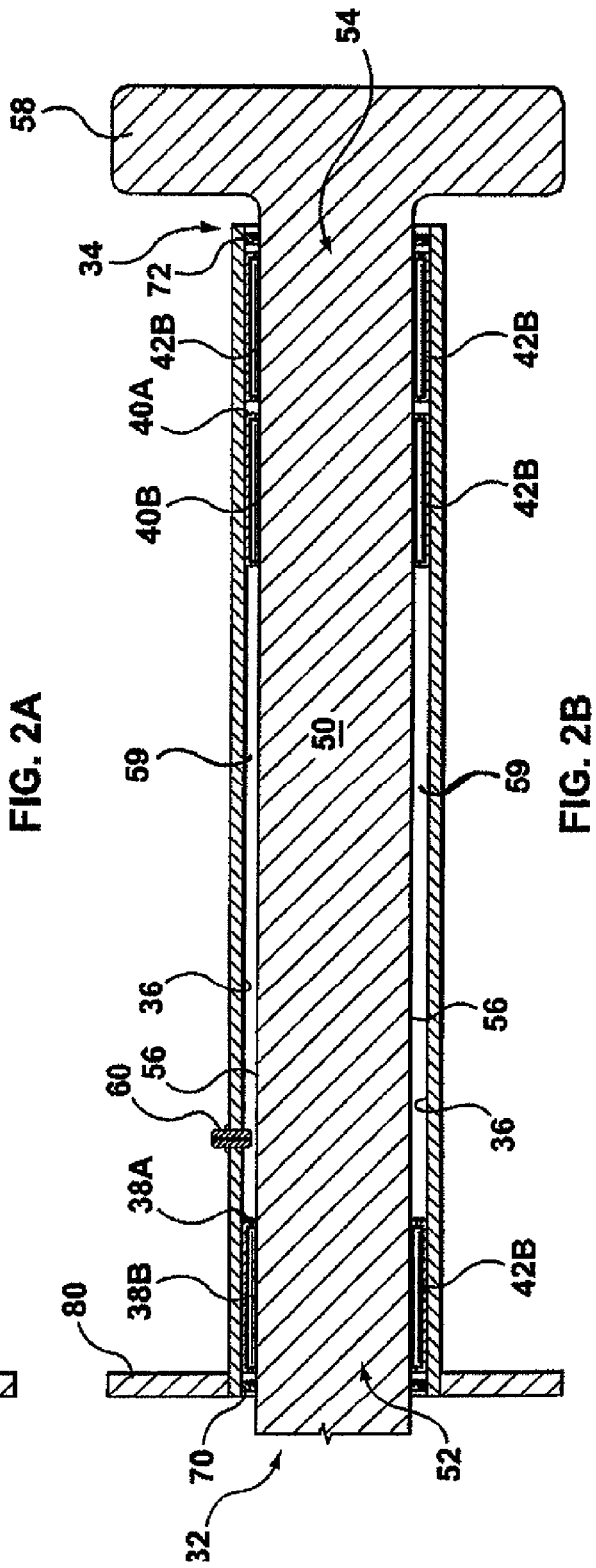

AUTOMOTIVE BRAKE CAM ASSEMBLY

CROSS-REFERENCE TO RELATED APPLICATION

This application is a continuation-in-part of, and claims priority to, U.S. Provisional Patent Application No. 60/983,998, the teachings of which are hereby incorporated by reference in their entirety.

FIELD OF INVENTION

The present invention relates to automotive brake cam assemblies that are mounted on a vehicle wheel axle and connect a brake cam by means of a cam rod to a brake actuator such that operation of the actuator rotates the cam to cause one or more brake shoes to engage an adjacent vehicle wheel in a braking manner.

BACKGROUND OF THE INVENTION

Such brake cam assemblies have been used on trucks, including tractors and trailers, for many years, with the actuator usually being pneumatically operated. However, a problem with known brake cam assemblies is that they require frequent maintenance and replacement, often having to be replaced annually.

One known approach used in brake cam construction is to journal the brake cam within a cam tube, rather than journaling opposed ends of the brake cam within spaced-apart mounting brackets.

Brake cam assemblies are disclosed in U.S. Pat. Nos. 4,813,516, 4,890,939, 5,316,115 and 6,378,658, and in German Patent Document No. DE3238351.

SUMMARY OF THE INVENTION

In one aspect, the present invention is directed to a brake cam assembly comprising a cam tube securable to a vehicle axle. The cam tube has, relative to the axle, an inboard end distal from a wheel to be braked, an outboard end proximal to the wheel to be braked, and an interior surface. At least one inboard bearing ring is secured inside the cam tube adjacent the inboard end thereof, and at least one outboard bearing ring is secured inside the cam tube adjacent the outboard end thereof. The brake cam assembly further comprises a cam rod having, relative to the axle, an inboard end distal from the wheel to be braked and an outboard end proximal to the wheel to be braked. The cam rod has an outer surface and carries a cam at its outboard end for actuating a brake mechanism. The cam rod is received within the cam tube so that the cam rod is rotatably supported by the bearing rings so as to be rotatable within the cam tube, with the outer surface of the cam rod being spaced from the interior surface of the cam tube. A quantity of lubricant is disposed within the cam tube, and a grease fitting is disposed in the cam tube to permit introduction of lubricant into the cam tube. An inboard sealing ring is disposed at the inboard end of the cam tube, inboard of the at least one inboard bearing ring, and an outboard sealing ring is disposed at the outboard end of the cam tube, outboard of the at least one outboard bearing ring.

In an embodiment, the inboard sealing ring is configured to permit lubricant leakage from within the cam tube at or above an inboard leakage pressure that is lower than an outboard leakage pressure at which the outboard sealing ring is configured to permit lubricant leakage from within the cam tube. In a particular embodiment, the inboard sealing ring and the outboard sealing ring are each configured to have a high pressure side and a low pressure side so that each low pressure side is operable to permit fluid leakage at a lower pressure than the corresponding high pressure side, the inboard sealing ring is positioned with its low pressure side facing in an outboard direction and toward the outboard sealing ring, and the outboard sealing ring is positioned with its low pressure side facing in an outboard direction and away from the inboard sealing ring, with the low pressure side of the inboard sealing ring defining the inboard leakage pressure and the high pressure side of the outboard sealing ring defining the outboard leakage pressure. The inboard sealing ring and the outboard sealing ring may be substantially identical sealing rings.

In an embodiment, the at least one inboard bearing ring comprises a single inboard bearing ring and the at least one outboard bearing ring comprises two outboard bearing rings.

In an embodiment, the bearing rings are needle roller bearings.

In an embodiment, the cam rod has a high-precision fit within the at least one inboard bearing ring and the at least one outboard bearing ring so as to inhibit vibration of the cam rod within the at least one inboard bearing ring and the at least one outboard bearing ring during vehicle operation.

In an embodiment, the cam rod fits within the at least one inboard bearing ring and the at least one outboard bearing ring with a tolerance of 0.0005 inches.

In an embodiment, at least the portions of the cam rod that are journaled in the at least one inboard bearing ring and the at least one outboard bearing ring are hardened.

In an embodiment, the portions of the cam rod that are journaled in the at least one inboard bearing ring and the at least one outboard bearing ring are hardened to RHC 58.

In an embodiment, the lubricant is synthetic lubricant.

DESCRIPTION OF THE DRAWINGS

An exemplary embodiment of the invention will now be described, by way of example, with reference to the accompanying drawings, of which:

FIG. 2A is a side cross-sectional view of a cam tube forming part of the exemplary brake cam assembly of FIG. 1;

FIG. 2B is the side cross-sectional view shown in FIG. 2A, with a cam rod also forming part of the exemplary brake cam assembly of FIG. 1 positioned within the cam tube (also shown in cross-section);

DETAILED DESCRIPTION

Figure 1:
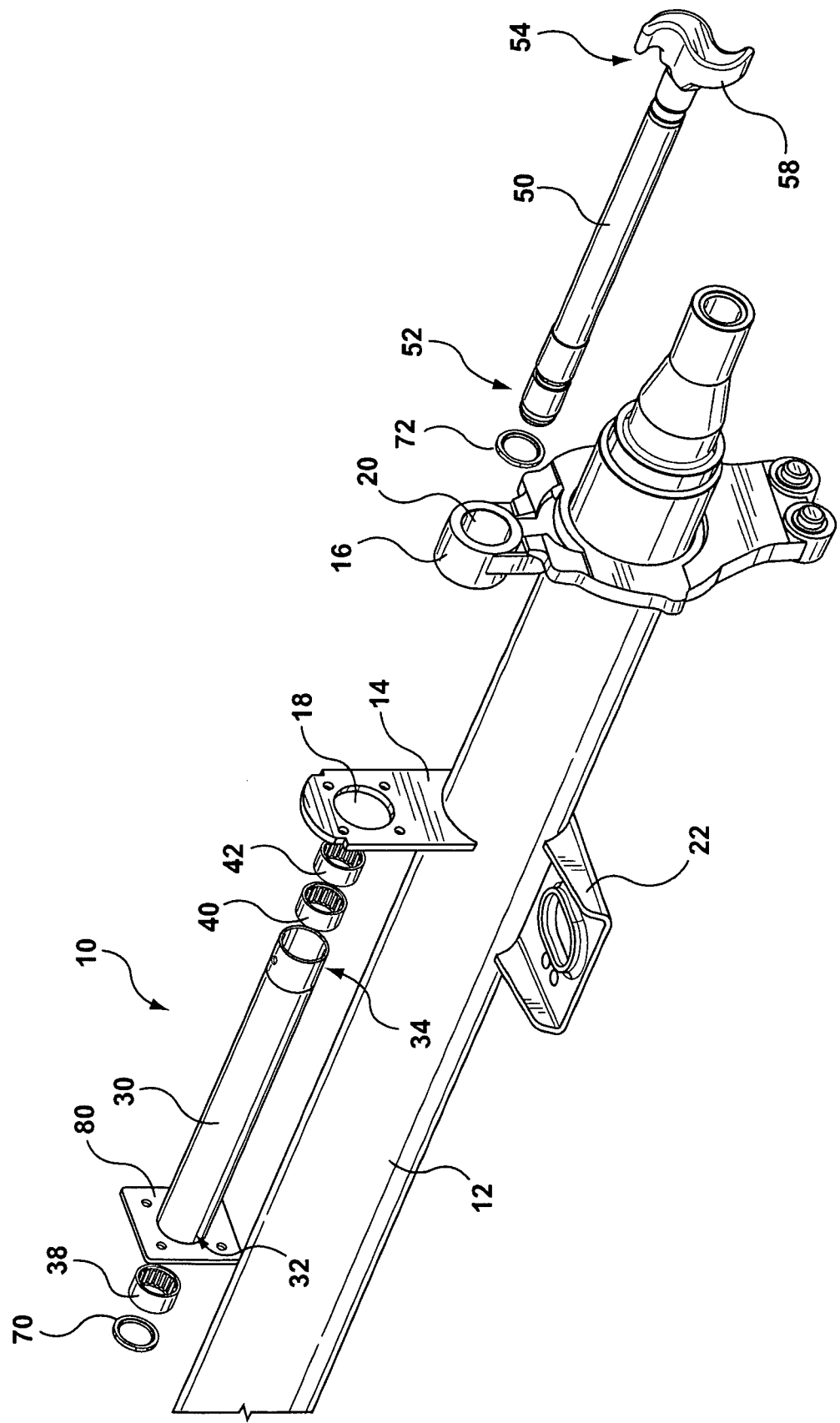
FIG. 1 is an exploded view of an exemplary embodiment of a brake cam assembly in accordance with an aspect of the present invention, and also showing a vehicle axle to which the brake cam assembly is to be fitted.

With reference now to FIG. 1, a brake cam assembly according to an aspect of the present invention is shown generally at 10. The brake cam assembly 10 is securable to a vehicle axle, such as truck axle 12. The illustrated axle 12 is a conventional truck axle, and includes an inboard cam assembly mounting bracket 14 and an outboard cam assembly mounting bracket 16, each having respective apertures 18, 20 defined therein. The axle 12 further includes an actuator mounting bracket 22 for mounting a brake actuator (not shown) which will actuate the cam assembly 10 and hence the brakes (not shown in FIG. 1).

The brake cam assembly 10 comprises a cam tube 30 securable to a vehicle axle (such as illustrated axle 12). The cam tube 30 has, relative to the axle 12, an inboard end 32 distal from a wheel to be braked (not shown in FIG. 1) and an outboard end 34 proximal to the wheel to be braked. The cam tube 30 also has an interior surface 36 (see FIGS. 2A and 2B).

An inboard bearing ring 38 is secured inside the cam tube 30 adjacent the inboard end 32 thereof, and two outboard bearing rings 40, 42 are secured inside the cam tube 30 adjacent the outboard end 34 thereof. In a particular embodiment, the bearing rings 38, 40, 42 are secured within the cam tube 30 by way of a friction fit.

The term "bearing rings", as used herein, refers to rings having a plurality of individually rotatable bearing elements arranged circumferentially within a circular or cylindrical housing. In the embodiment shown, and referring briefly to FIGS. 2A and 2B, the bearing rings 38, 40, 42 are needle roller bearings, respectively comprising ring-shaped casings 38A, 40A, 42A which each rotatably retain a plurality of cylindrical rollers 38B, 40B, 42B. In one embodiment, the bearing rings 38, 40, 42 are those offered under catalogue number B-2420 by the Timken Company, having an address of 1835 Dueber Ave., S.W., Canton, Ohio 44706-2798. Other suitable bearing rings may also be used.

Referring again to FIG. 1, the brake cam assembly 10 further comprises a cam rod 50 having, relative to the axle 12, an inboard end 52 distal from the wheel to be braked (not shown in FIG. 1) and an outboard end 54 proximal to the wheel to be braked. The cam rod 50 has an outer surface 56 (not specifically labeled in FIG. 1; see FIG. 2B) and carries a cam 58 at its outboard end 54 for actuating the brake (not shown in FIG. 1).

FIG. 2A shows a cross-sectional view of the cam tube 30, with the bearing rings 38, 40, 42 installed therein. FIG. 2A also shows an inboard sealing ring 70 (discussed further below) installed at the inboard end 32 of the cam tube 30, inboard of the inboard bearing ring 38, and an outboard sealing ring 72 (also discussed below), installed at the outboard end 34 of the cam tube 30, outboard of the outboard bearing rings 40, 42.

With reference now to FIG. 2B, the cam rod 50 is received within the cam tube 30 and journaled in the bearing rings so that the cam rod 50 is rotatably supported at or adjacent its ends 52, 54 by the bearing rings 38 and 40, 42, respectively, so as to be rotatable within the cam tube 30. More particularly, the outer surface 56 of the cam rod 50 engages the cylindrical rollers 38B, 40B, 42B of the bearing rings 38, 40, 42, and the outer surface 56 of the cam rod 50 is therefore spaced from (i.e. does not come in contact with) the interior surface 36 of the cam tube 30, so as to define an annular space 59 between the interior surface 36 of the cam tube 30 and the outer surface 56 of the cam rod 50.

While in the particular embodiment shown and described herein, a single inboard bearing ring 38 and two outboard bearing rings 40, 42 are used, in other embodiments different numbers of inboard bearing rings and outboard bearing rings may be used, as long as there is at least one inboard bearing ring and at least one outboard bearing ring, and as long the positions of the inboard bearing ring(s) and outboard bearing ring(s) define therebetween a region including an annular space (such as space 59) between the outer surface 56 of the cam rod 50 and the interior surface 36 of the cam tube 30. This annular space 59 serves as a reservoir in which lubricant may be retained.

In one embodiment, at least the portion of the cam rod 50 journaled in the inboard bearing ring 38 and the portion of the cam rod 50 journaled in the outboard bearing rings 40, 42 are hardened to resist wear. In one embodiment, where the bearing rings are needle roller bearings offered by the Timken Company under catalogue number B-2420, the corresponding portions of the cam rod 50 are hardened to a Rockwell hardness rating of RHC 58. Optionally, the entire cam rod 50 may be hardened. By way of example, case hardening or induction hardening may be used.

As indicated above, as used herein the term "bearing rings" refers to rings having a plurality of individually rotatable bearing elements (e.g. cylindrical rollers 38B, 40B, 42B) arranged circumferentially within a circular or cylindrical housing (e.g. ring-shaped casings 38A, 40A, 42A). As such, "bearing rings" should be distinguished from simple bushings, e.g. one-piece rings. In particular, the use of bearing rings having a plurality of individually rotatable bearing elements, rather than bushings, enables a cam rod 50 (described below) to have a very high-precision fit within the bearing rings (e.g. by way of precision grinding). For example, in a particular embodiment where the bearing rings 38, 40, 42 are B-2420 bearing rings offered by Timken Company, the clearance between the outer surface of the cam rod 50 and the cylindrical rollers 38B, 40B, 42B should be 0.0005 inches for use in a truck trailer. Without being limited by theory, it is believed that the high-precision fit between the cam rod 50 and the bearing rings 38, 40, 42 inhibits vibration of the cam rod 50 within the bearing rings 38, 40, 42 resulting from bumps and vibrations encountered during vehicle operation, thereby producing the surprising benefit of reducing wear on the cam rod 50 and extending the useful life of a brake cam assembly 10 constructed according to an aspect of the present invention. Again without being limited by theory, it is further believed that hardening of the cam rod 50 cooperates with the high-precision fit between the cam rod 50 and the bearing rings 38, 40, 42 to further resist wear of the cam rod 50 and thereby further prolong the useful life of a brake cam assembly 10 constructed according to an aspect of the present invention. Also without being limited by theory, it is believed that a high-precision fit between a cam rod and bushings (as opposed to bearing rings) would be generally infeasible because the cam rod would tend to seize within the bushings, even if lubricated, and it is believed that the use of bearing rings substantially obviates this problem.

A quantity of lubricant (not specifically illustrated or numbered) is disposed within the cam tube, in particular in the annular space 59, and may be introduced by way of grease fitting 60 installed in the cam tube 30. Lubrication is introduced to the cam tube 30 during assembly of the brake cam assembly 10, and additional grease is introduced into the cam tube 30 after assembly by way of grease fitting to achieve appropriate pressure. In one embodiment, the lubricant is a synthetic lubricant. For example, Delo® Number 2synthetic grease, a product of Chevron Global Lubricants, may be used. Other suitable lubricants may also be used.

Figure 3:
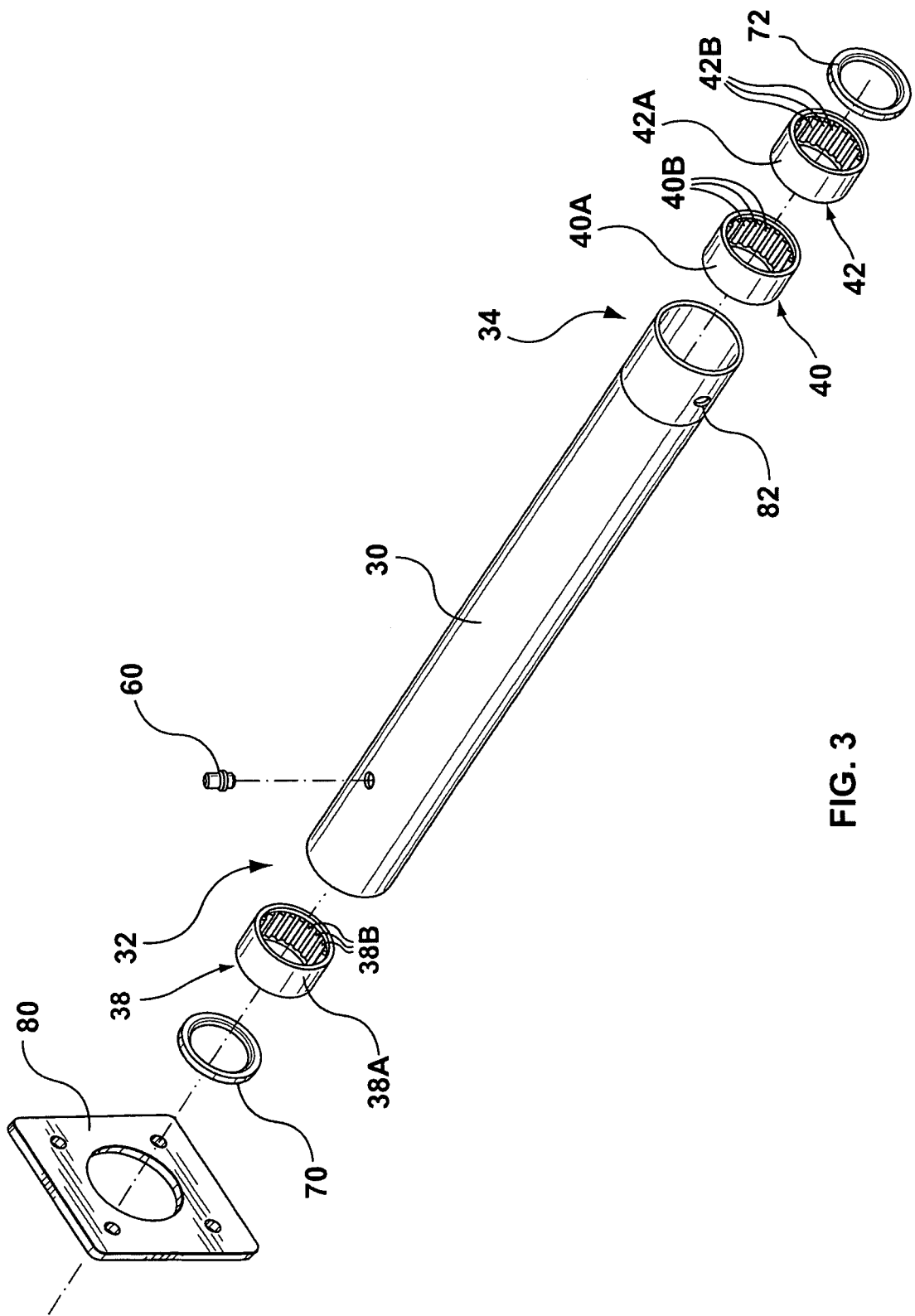
FIG. 3 is an exploded view of the cam tube and associated components of the exemplary brake cam assembly.

Referring now to FIGS. 2A, 2B and 3, an inboard sealing ring 70 is disposed at the inboard end 32 of the cam tube 30, and an outboard sealing ring 72 is disposed at the outboard end 34 of the cam tube 30. As will be appreciated, the inboard sealing ring 70 and the outboard sealing ring 72 facilitate retention of lubricant within the cam tube 30.

In an embodiment, the inboard sealing ring 70 will define an inboard leakage pressure at or above which lubricant inside the cam tube 30 will overcome the sealing effect of the inboard sealing ring 70 and escape from the cam tube 30. Similarly, the outboard sealing ring 72 will define an outboard leakage pressure at or above which lubricant inside the cam tube 30 will overcome the sealing effect of the outboard sealing ring 72 and escape from the cam tube 30. In a presently preferred embodiment, the inboard sealing ring 70 and the outboard sealing ring 72 are configured so that the inboard leakage pressure is less than the outboard leakage pressure. Thus, because lubricant under pressure will preferentially escape via the inboard sealing ring 70, there is a reduced risk of such lubricant reaching the braking system and inhibiting brake operation.

In one embodiment, conventional radial shaft seals may be used. Conventional radial shaft seals generally comprise an annular metal frame surrounding an annular lip made from an elastomeric material, with the annular lip being biased into point contact with the shaft (in this case cam rod 50) by an annular garter spring. The angles on each side of the annular lip generally define a high pressure side of the radial shaft seal and a low pressure side of the radial shaft seal, with the high pressure side being able to resist greater fluid pressure prior to leakage than the low pressure side. Where such radial shaft seals are used as sealing rings 70, 72 in an embodiment of an aspect of the present invention such as the brake cam assembly 10, the inboard sealing ring 70 can be positioned with its low pressure side facing in an outboard direction, i.e. toward the outboard sealing ring 72, and the outboard sealing ring 72 can also be positioned with its low pressure side facing in an outboard direction, i.e. away from the inboard sealing ring 70. Thus, the low pressure side of the inboard sealing ring 70 defines the inboard leakage pressure, and the high pressure side of the outboard sealing ring 72 defines the outboard leakage pressure, it being understood (as noted above) that the inboard leakage pressure is less than the outboard leakage pressure. The aforementioned configuration permits identical or substantially identical sealing rings to be used for the inboard sealing ring 70 and the outboard sealing ring 72, with the differential between the inboard leakage pressure and the outboard leakage pressure being achieved by selective positioning of the high pressure side and low pressure side of the respective sealing rings 70, 72. Alternatively, the inboard sealing ring 70 may be selected so that its high pressure side leaks at a lower pressure than the high pressure side of the outboard sealing ring 72 (i.e. the two sealing rings 70, 72 may be different), and both of the sealing rings 70, 72 may be positioned so that their high pressure sides face inwardly, one toward the other.

In the above-described configurations, the brake cam assembly 10 is configured so that the inboard sealing ring 70 is effectively operable to function as a one-way valve to inhibit ingress of foreign matter into the cam tube 30 and to enable excess lubricant to escape from the cam tube 30 for relief of pressure therein when a particular pressure threshold is exceeded. The outboard sealing ring 72 is operable both to inhibit ingress of foreign matter into the cam tube 30 and to inhibit egress of lubricant from the cam tube 30.

Referring now to FIG. 3, the cam tube 30 has a mounting plate 80 at its inboard end 32 which, when the brake cam assembly 10 is installed on an axle (such as axle 12), mates with and can be secured to the inboard cam assembly mounting bracket 14. The mounting plate 80 may be secured to the inboard end 32 of the cam tube 30 by welding, for example. Optionally, the cam tube 30 may include an aperture 82 adjacent the outboard end 34 thereof, which would, when the brake cam assembly 10 is installed, be in registration with a grease fitting (not shown) disposed in mounting bracket 16 to enable the outboard bearing rings 40, 42 to be additionally lubricated.

Referring again to FIG. 1, during installation, the outboard end 34 of the cam tube 30 will be slid first through the aperture 18 in the inboard cam assembly mounting bracket 14 and then through the aperture 20 in the outboard cam assembly mounting bracket 16. The mounting plate 80 can then be secured to the inboard cam assembly mounting bracket 14 (for example by bolts) to secure the cam tube 30 (which would typically have the bearing rings 38, 40, 42 already secured therein) to the axle 12. The inboard and outboard sealing rings 70, 72 can then be positioned and the cam rod 50 inserted into the cam tube 30. Once positioned inside the cam tube 30, the cam rod 50 will be maintained in position by the lever 90 (described below).

Figure 5:
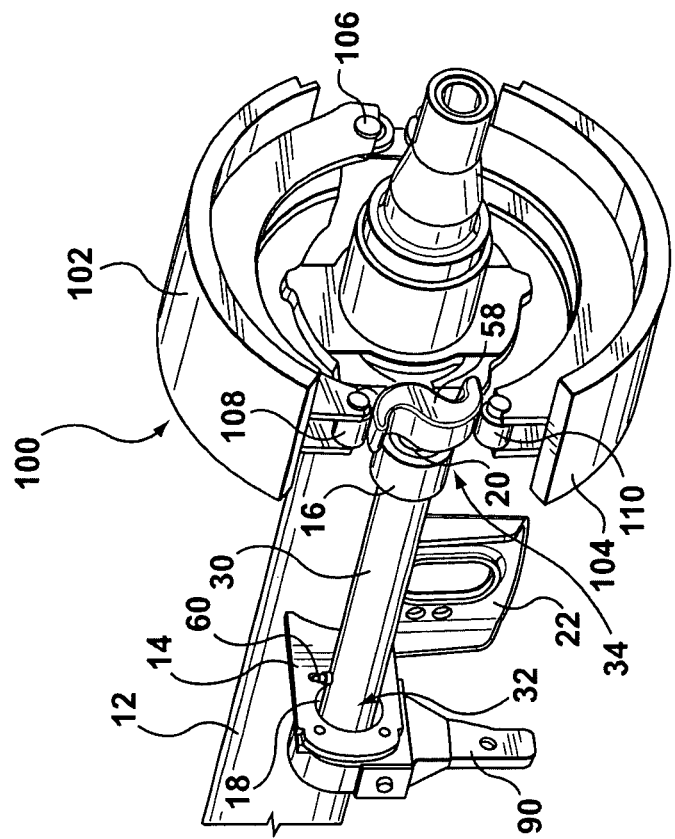
FIG. 5 is a perspective view showing the exemplary brake cam assembly of FIG. 1 mounted on an axle, showing brake shoes in a wheel-engaging configuration.
Figure 4:
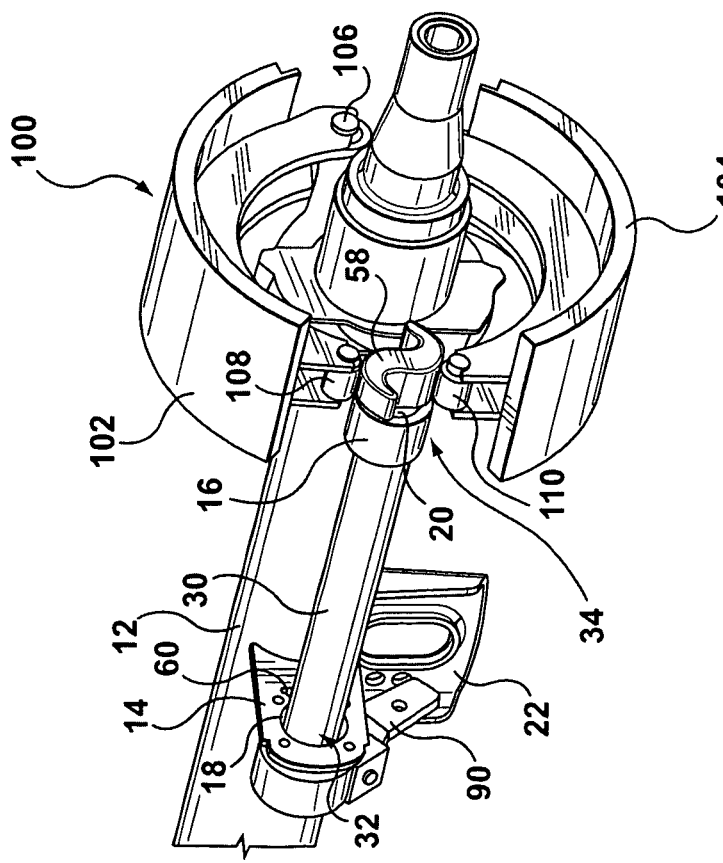
FIG. 4 is a perspective view showing the exemplary brake cam assembly of FIG. 1 mounted on an axle, showing brake shoes in a disengaged configuration.

With reference now to FIGS. 4 and 5, it can be seen that the inboard end 52 of the cam rod 50 extends beyond the mounting plate 14 and carries a lever 90 which is mechanically coupled to an actuator (not shown) carried by the mounting plate 22, as will be well known to a person skilled in the art. Typically, the actuator would be pneumatically operated. A conventional brake assembly 100 is mounted in known manner on the outboard end of axle 12 and includes opposed brake shoes 102, 104 actuated by rotation of the cam 58. Again, as will be readily apparent to a person skilled in the art, the brake shoes 102, 104 are pivotally mounted on a pivot pin 106 at one end and have cam followers 108, 110 engaging the cam 58 at the other end. Thus, the actuator (not shown) will be operable to move the lever 90 and thereby rotate the cam rod 50 within the cam tube 30, so that rotation of the cam 58 will move the brake shoes 102, 104 into (FIG. 5) and out of (FIG. 4) engagement with a vehicle wheel (not shown).

Reference has been made herein to vehicles, vehicle axles, vehicle wheels, and brake components (including but not limited to brake shoes). Neither the vehicles, vehicle axles, vehicle wheels, and brake components (other than the brake cam assembly itself), form part of the present invention, and any references to such vehicles, vehicle axles, vehicle wheels, and brake components in the claims are intended solely to define attributes of the invention and not to define any such vehicles, vehicle axles, vehicle wheels, or brake components as a component of any embodiment of any aspect of the invention. Rather, the vehicles, vehicle axles, vehicle wheels, and brake components herein described are merely exemplary vehicles, vehicle axles, vehicle wheels, and brake components (respectively) representative of vehicles, vehicle axles, vehicle wheels, and brake components in association with which embodiments of aspects of the present invention may be used.

One or more currently preferred embodiments have been described by way of example. It will be apparent to persons skilled in the art that a number of variations and modifications can be made without departing from the scope of the invention as defined in the claims. More particularly, it will be appreciated that various individual features from exemplary embodiments described herein may be combined to produce an embodiment not explicitly shown or described, without departing from the scope of the present invention.

Other advantages and embodiments of the invention will now be readily apparent to a person skilled in the art from the foregoing description.

The invention claimed is:

1. A brake cam assembly, comprising: a cam tube securable to a vehicle axle, the cam tube having, relative to the axle, an inboard end distal from a wheel to be braked and an outboard end proximal to the wheel to be braked, and an interior surface; at least one inboard bearing ring secured inside the cam tube adjacent the inboard end thereof; at least one outboard bearing ring secured inside the cam tube adjacent the outboard end thereof; a cam rod having, relative to the axle, an inboard end distal from the wheel to be braked and an outboard end proximal to the wheel to be braked, the cam rod having an outer surface and carrying a cam at its outboard end for actuating a brake mechanism; the cam rod being received within the cam tube so that the cam rod is rotatably supported by the bearing rings so as to be rotatable within the cam tube, with the outer surface of the cam rod being spaced from the interior surface of the cam tube; a quantity of lubricant disposed within the cam tube; a grease fitting disposed in the cam tube to permit introduction of lubricant into the cam tube; an inboard sealing ring disposed at the inboard end of the cam tube, inboard of the at least one inboard bearing ring; an outboard sealing ring disposed at the outboard end of the cam tube, outboard of the at least one outboard bearing ring; wherein the inboard sealing ring is configured to permit lubricant leakage from within the cam tube at or above an inboard leakage pressure that is lower than a pressure at which lubricant would leak past the outboard sealing ring; wherein the bearing rings are needle roller bearings; wherein the cam rod has a high-precision fit within the at least one inboard bearing ring and the at least one outboard bearing ring so as to inhibit vibration of the cam rod within the at least one inboard bearing ring and the at least one outboard bearing ring during vehicle operation; and wherein at least portions of the cam rod journaled in the at least one inboard bearing ring and the at least one outboard bearing ring are hardened; wherein the cam rod fits within the at least one inboard bearing ring and the at least one outboard bearing ring with a tolerance of 0.0005 of an inch.

2. A brake cam assembly, comprising: a cam tube securable to a vehicle axle, the cam tube having, relative to the axle, an inboard end distal from a wheel to be braked and an outboard end proximal to the wheel to be braked, and an interior surface; at least one inboard bearing ring secured inside the cam tube adjacent the inboard end thereof, at least one outboard bearing ring secured inside the cam tube adjacent the outboard end thereof; a cam rod having, relative to the axle, an inboard end distal from the wheel to be braked and an outboard end proximal to the wheel to be braked, the cam rod having an outer surface and carrying a cam at its outboard end for actuating a brake mechanism; the cam rod being received within the cam tube so that the cam rod is rotatably supported by the bearing rings so as to be rotatable within the cam tube, with the outer surface of the cam rod being spaced from the interior surface of the cam tube; a quantity of lubricant disposed within the cam tube; a grease fitting disposed in the cam tube to permit introduction of lubricant into the cam tube; an inboard sealing ring disposed at the inboard end of the cam tube, inboard of the at least one inboard bearing ring; an outboard sealing ring disposed at the outboard end of the cam tube, inboard of the at least one outboard bearing ring; wherein the inboard sealing ring is configured to permit lubricant leakage from within the cam tube at or above an inboard leakage pressure that is lower than a pressure at which lubricant would leak past the outboard sealing ring; wherein the bearing rings are needle roller bearings; wherein the cam rod has a high-precision fit within the at least one inboard bearing ring and the at least one outboard bearing ring so as to inhibit vibration of the cam rod within the at least one inboard bearing ring and the at least one outboard bearing ring during vehicle operation; and wherein at least portions of the cam rod journaled in the at least one inboard bearing ring and the at least one outboard bearing ring are hardened; wherein the portions of the cam rod journaled in the at least one inboard bearing ring and the at least one outboard bearing ring are hardened to RHC 58.

* * * * *